United States Patent Office 3,160,675
Patented Dec. 8, 1964

3,160,675
HIGH TEMPERATURE ADHESIVE
Clarence J. Kastrop, Brigham City, Utah, assignor to General Dynamics Corporation, San Diego, Calif., a corporation of Delaware
No Drawing. Filed Aug. 7, 1961, Ser. No. 129,520
5 Claims. (Cl. 260—826)

This invention relates in general to resin compositions, and more particularly, to resin compositions resistant to high temperatures and particularly well adapted for use as structural adhesives in bonding aircraft honeycomb sandwich structures, beaded skins and radomes. The invention has further utility in the production of potting materials, plastic laminates, and encapsulating materials, and coatings.

Recently considerable advances have taken place in the art of adhesive bonding of structural aircraft components. Through the use of structural adhesives based upon organic polymeric materials, designers have been able to take advantage of the inherent qualities of bonded primary and secondary structures. Although these adhesives have adequately served the past needs of aircraft manufactures, there are indications that these adhesives cannot fulfill future requirements due to their high temperature limitations. Thus, temperatures of 400° F. to 500° F. are being encountered on some present day aircraft, well exceeding the 250° F. to 300° F. upper temperature limits of present organic based structural adhesives. It is therefore an object of this invention to provide a resin composition having wide utility which effectively resists degradation at elevated temperatures as high as 500° F. for considerable periods of time.

The composition of this invention is formulated from an epoxy novolac polymer utilized as the resin base. The amine, diaminodiphenyl sulfone, is used as a curing agent and 1,3-bis[3(2,3 epoxypropoxy)propyl] tetramethyldisiloxane, and epoxy siloxane monomer of relatively low molecular weight, is incorporated as a reactive solvent.

The p,p'-diaminodiphenyl sulfone has proven particularly satisfactory as a curing agent since it imparts good high temperature characteristics to the epoxy resin. However, considerable difficulty is encountered in the use of diaminodiphenyl sulfone as a curing agent because of its insolubility in epoxy resins. It is therefore necessary to incorporate a solvent to effect complete solution. This raises the further problem of formation of objectionable voids, holes, and bubbles and the like which arises where volatile solvents are used in the adhesive system. It has however, been found that by utilizing 1,3-bis[3(2,3 epoxypropoxy)propyl] tetramethyldisiloxane, the diaminodiphenyl sulfone goes into solution without the use of volatile solvents and that there is thus effected a 100% solids resin, free of the aforementioned degrading effects encountered with the use of volatile solvents. The 1,3-bis-[3(2,3 epoxypropoxy)propyl] tetramethyldisiloxane constitutes a reactive solvent and becomes an integral part of the resin.

It has also been found that the 1,3-bis[3(2,3 epoxypropoxy)propyl]tetramethyldisiloxane, when reacted with the diaminodiphenyl sulfone to form an adduct gives results superior to those experienced when these ingredients are added separately to the epoxy novolac polymer to produce the resin product. In this case, i.e., in the formation of the adduct, it is necessary that an excess of the diaminodiphenyl sulfone be utilized to produce a surplus of active amine groups to effectuate suitable cross linking.

Still superior results are obtained when there is separately added to this product predetermined quantities of diaminodiphenyl sulfone and 1,3-bis[3(2,3 epoxypropoxy)-propyl] tetramethyldisiloxane, i.e., in addition to the quantities of same entering into the adduct. With the use of 100 parts by weight of epoxy novolac polymer, the adduct may range from 36.4 to 56.4 parts by weight and the p,p'-diaminodiphenyl sulfone from 4.0 to 4.8 parts by weight and the 1,3-bis[3(2,3 epoxypropoxy)propyl]tetramethyldisiloxane from 6.2 to 15.0 parts by weight. However, a still better and preferred composition is set forth below as "Example I" in which to 100 parts by weight of epoxy novolac polymer there is proportioned 46.4 parts by weight of adduct, 4.4 parts by weight of diaminodiphenyl sulfone and 13.8 parts by weight of 1,3-bis[3(2,3 epoxypropoxy)propyl]tetramethyldisiloxane, together with filler. The lap shear test results tabulated below point up the relative merits of the different composition formulations.

The epoxy novolac polymer used in formulating the resin of the invention is characterized by its thermal stability and ease of fabrication. Its typical uncured properties are enumerated in the table below. Its formula is as follows:

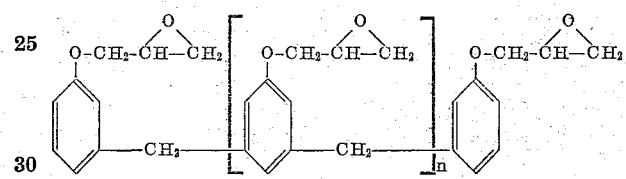

Average value of $n = 3.5$

Molecular weight _____ 600.
Epoxide equivalent weight _____ 176.
Epoxy functionality _____ 3.5.
Viscosity, 77° F. cps. _____ Semi-solid.
Specific gravity 25°/40° C. _____ 1.22.
Total chlorine, maximum _____ 0.25.

The reactive solvent 1,3-bis[3(2,3 epoxypropoxy)propyl]tetramethyldisiloxane may be represented by the following formula:

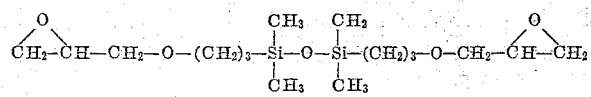

Its properties are as follows:
Physical form _____ Low viscosity fluid.
Color _____ Light straw to clear.
Viscosity, centistokes _____ 10 to 12.
Specific gravity (77° F.) _____ 0.99 to 1.00.
Epoxy equivalent weight _____ 180 to 190.
Boiling point at 2 mm. _____ 95% between 365 and 375° F.
Flash point, minimum _____ 345° F.
Fire point, minimum _____ 390° F.
Solubility in water _____ Nil.
Solubility in common organic
 solvents _____ Complete.
Hydrolyzable chloride _____ Less than 0.001%.

The following examples are given to illustrate the invention, but it will be understood that the examples are intended merely as illustrations of the invention and are not intended to limit its scope. Reference in the specification and claims to parts, proportions and percentages, unless otherwise specified, refer to parts, proportions and percentages by weight.

EXAMPLE I

Ingredients: Parts by weight
- Epoxy novolac polymer — 100
- Adduct — 46.4
- p,p'-Diaminodiphenyl sulfone — 4.4
- 1,3-bis[3(2,3 epoxypropoxy)propyl]tetramethyldisiloxane — 13.8
- Filler (titanium dioxide) — 100

The adduct is preferably prepared from the epoxy siloxane monomer and the amine as follows: 1 mol (363 grams) of the above 1,3-bis[3(2,3 epoxypropoxy)propyl]tetramethyldisiloxane and 10 mols (2480 grams) of the p,p'-diaminodiphenyl sulfone are reacted in a glass vessel at 350° F. for one hour with continuous stirring. The material is then cooled and broken into lumps and pulverized.

The epoxy novolac polymer is then heated to a workable consistency and the above adduct is added, together with the filler, the 1,3-bis[3(2,3 epoxypropoxy)propyl]tetramethyldisiloxane, and the p,p'-diaminodiphenyl sulfone. With reference to the filler, it should be understood that a variety of materials may be used and in different quantities, depending upon the desired resin application. In the above example the use of titanium dioxide is contemplated for the production of an excellent adhesive. As pointed out hereinafter, considerations such as radio and radar transparency and electrical conductivity of the resin may be important in certain instances and the filler content will be governed accordingly.

The hot melt process may be used in applying the composition as a structural adhesive. While the resin composition is still in a molten workable state, i.e., immediately after incorporation of all of the constituents, as above, it may be spread on both sides of 112 volen A finish glass cloth. The resin-spread cloth is then placed between two sheets of mylar or polyethylene film. The composite film is next passed between heated rolls to smooth out the resin, to eliminate air pockets and to reduce the composite film to the desired thickness. The film is then ready for use as a structural adhesive, requiring heat and pressure for the final cure. Where extended storage of the composite film is contemplated, it should be accomplished under refrigeration.

The following lap shear strengths were exhibited by the above composition when used as an adhesive for bonding titanium panels. It is particularly important to note the low loss in room temperature shear strength after aging at 500° F., which indicates that the adhesive system effectively resists embrittlement. The adhesive, it should be noted, is suitable for metal to metal and metal to core bonding.

*Tensile Lap Shear Strength*

| Time at 500° F., Hours | Tensile Lap Shear Strength, p.s.i. at— | |
|---|---|---|
| | 75° F. | 500° F. |
| 0 | 2,360 | 720 |
| 3 | 1,970 | 800 |
| 100 | 1,820 | 930 |

EXAMPLE II

Ingredients: Parts by weight
- Epoxy novolac polymer — 100
- Adduct — 36.4
- p,p'-Diaminodiphenyl sulfone — 4.8
- 1,3-bis[3(2,3 epoxypropoxy)propyl]tetramethyldisiloxane — 15.0
- Filler (titanium dioxide) — 100

The composition is formulated in the manner of Example I and may be similarly applied as an adhesive. The following are the results of lap shear tests obtained with this composition.

*Tensile Lap Shear Strength*

| Time at 500° F., Hours | Tensile Lap Shear Strength, p.s.i. at— | |
|---|---|---|
| | 75° F. | 500° F. |
| 0 | 2,370 | |
| 3 | | 605 |
| 100 | 1,780 | 890 |

EXAMPLE III

Ingredients: Parts by weight
- Epoxy novolac polymer — 100
- Adduct — 56.4
- p,p'-diaminodiphenyl sulfone — 4.0
- 1,3-bis[3(2,3-epoxypropoxy)propyl]tetramethyldisiloxane — 6.2
- Filler (titanium dioxide) — 100

The method for formulating and using this compound as an adhesive is the same as that described above with regard to Example I. Lap shear test results exhibited by this composition were as follows:

*Tensile Lap Shear Strength*

| Time at 500° F., Hours | Tensile Lap Shear Strength, p.s.i. at— | |
|---|---|---|
| | 75° F. | 500° F. |
| 0 | 2,280 | |
| 3 | | 650 |
| 100 | 1,530 | 1,040 |

The method of formulating Examples IV and V below is similar to that above indicated for Example I. These examples point up the variations which may be effected in the type and quantity of filler material used in the formulation. In Example IV the use of finely divided silica as a filler is contemplated where-as in Example V aluminum powder serves as a filler. The composition of Example IV has proven particularly satisfactory for bonding such units as radar shields where a high degree of radio and radar transparency is required. The composition is also excellent in encapsulating applications. Example V has particular utility as an adhesive where high strength is essential but transparency is not particularly important.

EXAMPLE IV

Ingredients: Parts by weight
- Epoxy novolac polymer — 100
- Adduct — 48.2
- p,p'-Diaminodiphenyl sulfone — 4.8
- 1,3-bis[3(2,3 epoxypropoxy)propyl]tetramethyldisiloxane — 14
- Filler (silica) — 5.0

EXAMPLE V

Ingredients: Parts by weight
- Epoxy novolac polymer — 100
- Adduct — 48.2
- p,p'-Diaminodiphenyl sulfone — 4.8
- 1,3-bis[3(2,3-epoxypropoxy)propyl]tetramethyldisiloxane — 14
- Filler (aluminum powder) — 100

As has been heretofore indicated, the preferred formulations of the invention contain in addition to the adduct, individually added quantities of diaminodiphenyl sulfone and 1,3-bis[3(2,3 epoxypropoxy)propyl] tetramethyldisiloxane. However, the following formulation, though not exhibiting as good high temperature characteristics as the other examples, provides the aforementioned advantages gained from elimination of the use of a volatile solvent. The composition therefore is particularly good as an adhesive.

EXAMPLE VI

| Ingredients: | Parts by weight |
|---|---|
| Epoxy novolac polymer | 100 |
| Adduct | 46 |
| Filler | 3 |

I claim:

1. The product of the reaction of an epoxy novolac polymer of the formula $$\text{[epoxy novolac structure with O-CH}_2\text{-CH-CH}_2 \text{ epoxide groups on phenyl rings connected by CH}_2 \text{ bridges, with repeat unit n]}$$

in which the average value of $n=3.5$, with p,p'-diaminodiphenyl sulfone, 1,3-bis[3(2,3 epoxypropoxy)propyl]tetramethyldisiloxane of the formula $$CH_2\text{-}CH\text{-}CH_2\text{-}O\text{-}(CH_2)_3\text{-}Si(CH_3)_2\text{-}O\text{-}Si(CH_3)_2\text{-}(CH_2)_3\text{-}O\text{-}CH_2\text{-}CH\text{-}CH_2$$

(with terminal epoxide groups)

and an adduct comprised of p,p'-diaminodiphenyl sulfone and 1,3-bis[3(2,3 epoxypropoxy)propyl]tetramethyldisiloxane of the formula $$CH_2\text{-}CH\text{-}CH_2\text{-}O\text{-}(CH_2)_3\text{-}Si(CH_3)_2\text{-}O\text{-}Si(CH_3)_2\text{-}(CH_2)_3\text{-}O\text{-}CH_2\text{-}CH\text{-}CH_2$$

an excess of p,p'-diaminodiphenyl sulfone entering into the formulation of said adduct to provide amine groups as the terminal groups of the adduct molecule.

2. The product of the reaction of 100 parts by weight of an epoxy novolac polymer of the formula $$\text{[epoxy novolac structure as above]}$$

in which the average value of $n=3.5$, with from 4.0 to 4.8 parts by weight of p,p'-diaminodiphenyl sulfone, 6.2 to 15.0 parts by weight of 1,3-bis[3(2,3 epoxypropoxy)propyl]tetramethyldisiloxane of the formula $$CH_2\text{-}CH\text{-}CH_2\text{-}O\text{-}(CH_2)_3\text{-}Si(CH_3)_2\text{-}O\text{-}Si(CH_3)_2\text{-}(CH_2)_3\text{-}O\text{-}CH_2\text{-}CH\text{-}CH_2$$

and from 36.4 to 56.4 parts by weight of an adduct comprised of p,p'-diaminodiphenyl sulfone and 1,3-bis[3(2,3 epoxypropoxy)propyl]tetramethyldisiloxane of the formula $$CH_2\text{-}CH\text{-}CH_2\text{-}O\text{-}(CH_2)_3\text{-}Si(CH_3)_2\text{-}O\text{-}Si(CH_3)_2\text{-}(CH_2)_3\text{-}O\text{-}CH_2\text{-}CH\text{-}CH_2$$

an excess of p,p'-diaminodiphenyl sulfone entering into the formulation of said adduct to provide amine groups as the terminal groups of the adduct molecule.

3. The product of the reaction of 100 parts by weight of an epoxy novolac polymer of the formula $$\text{[epoxy novolac structure as above]}$$

in which the average value of $n=3.5$ with from 4.0 to 4.8 parts by weight of p,p'-diaminodiphenyl sulfone, 6.2 to 15.0 parts by weight of 1,3-bis[3(2,3 epoxypropoxy)propyl]tetramethyldisiloxane of the formula $$CH_2\text{-}CH\text{-}CH_2\text{-}O\text{-}(CH_2)_3\text{-}Si(CH_3)_2\text{-}O\text{-}Si(CH_3)_2\text{-}(CH_2)_3\text{-}O\text{-}CH_2\text{-}CH\text{-}CH_2$$

and from 36.4 to 56.4 parts by weight of an adduct comprised of p,p'-diaminodiphenyl sulfone, and 1,3-bis[3(2,3 epoxypropoxy)propyl]tetramethyldisiloxane of the formula $$CH_2\text{-}CH\text{-}CH_2\text{-}O\text{-}(CH_2)_3\text{-}Si(CH_3)_2\text{-}O\text{-}Si(CH_3)_2\text{-}(CH_2)_3\text{-}O\text{-}CH_2\text{-}CH\text{-}CH_2$$

said adduct ingredients being respectively proportioned one to the other in a molar ratio of 10 to 1.

4. The product of the reaction of 100 parts by weight of an epoxy novolac polymer of the formula $$\text{[epoxy novolac structure as above]}$$

in which the average value of $n=3.5$, with 4.4 parts by weight of p,p'-diaminodiphenyl sulfone, 13.8 parts by weight of 1,3-bis[3(2,3 epoxypropoxy)propyl]tetramethyldisiloxane of the formula $$CH_2\text{-}CH\text{-}CH_2\text{-}O\text{-}(CH_2)_3\text{-}Si(CH_3)_2\text{-}O\text{-}Si(CH_3)_2\text{-}(CH_2)_3\text{-}O\text{-}CH_2\text{-}CH\text{-}CH_2$$

and 46.4 parts by weight of an adduct comprised of p,p'-diaminodiphenyl sulfone and 1,3-bis[3(2,3 epoxypropoxy)propyl]tetramethyldisiloxane of the formula $$CH_2\text{-}CH\text{-}CH_2\text{-}O\text{-}(CH_2)_3\text{-}Si(CH_3)_2\text{-}O\text{-}Si(CH_3)_2\text{-}(CH_2)_3\text{-}O\text{-}CH_2C\text{-}CH\text{-}CH_2$$

an excess of p,p'-diaminodiphenyl sulfone entering into the formulation of said adduct to provide amine groups as the terminal groups of the adduct molecule.

5. The product of the reaction of 100 parts by weight of an epoxy novolac polymer of the formula $$\text{[epoxy novolac structure as above]}$$

in which the average value of $n=3.5$, with 4.4 parts by weight of p,p'-diaminodiphenyl sulfone, 13.8 parts by weight of 1,3-bis[3(2,3 epoxypropoxy)propyl]tetramethyldisiloxane of the formula

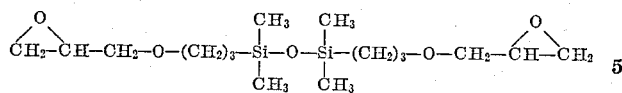

and 46.4 parts by weight of an adduct comprised of p,p'-diaminodiphenyl sulfone, and 1,3 - bis[3(2,3 epoxypropoxy)propyl]tetramethyldisiloxane of the formula

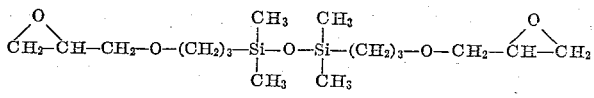

said adduct ingredients being respectively proportioned one to the other in a molar ratio of 10 to 1.

References Cited by the Examiner

UNITED STATES PATENTS 2,938,004   5/60   De Hoff et al. _____ 260—2

FOREIGN PATENTS 586,873   11/59   Canada.

OTHER REFERENCES

Dow Corning Corporation, Midland, Mich., "New Products Information," Bulletin No. Q-2-101, December 1957 (7 pages).

MURRAY TILLMAN, *Primary Examiner.*
LEON J. BERCOVITZ, *Examiner.*